(12) United States Patent
Gielen et al.

(10) Patent No.: US 10,184,617 B2
(45) Date of Patent: Jan. 22, 2019

(54) LED TUBE FOR RETROFITTING IN A FLUORESCENT TUBE LIGHTING FIXTURE

(71) Applicant: PHILIPS LIGHTING HOLDING B.V., Eindhoven (NL)

(72) Inventors: Vincent Stefan David Gielen, Eindhoven (NL); Mark Verhoeven, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/110,385

(22) PCT Filed: Jan. 5, 2015

(86) PCT No.: PCT/EP2015/050072
§ 371 (c)(1),
(2) Date: Jul. 7, 2016

(87) PCT Pub. No.: WO2015/104246
PCT Pub. Date: Jul. 16, 2015

(65) Prior Publication Data
US 2016/0327216 A1     Nov. 10, 2016

(30) Foreign Application Priority Data

Jan. 13, 2014    (EP) .................................... 14150893

(51) Int. Cl.
*H05B 41/298*     (2006.01)
*F21K 9/278*     (2016.01)
(Continued)

(52) U.S. Cl.
CPC ............... *F21K 9/278* (2016.08); *F21K 9/27* (2016.08); *F21K 9/272* (2016.08); *F21V 15/015* (2013.01);
(Continued)

(58) Field of Classification Search
CPC ........... F21Y 2103/10; F21Y 2103/003; F21Y 2103/00; F21K 9/27; F21K 9/175;
(Continued)

(56) References Cited

U.S. PATENT DOCUMENTS 4,102,558 A * 7/1978 Krachman ................ H01J 5/50
                                                                            313/318.02
4,205,293 A * 5/1980 Melton .................... C22F 1/006
                                                                             337/139

(Continued)

FOREIGN PATENT DOCUMENTS

EP           2503235 A1    9/2012
JP         2012134181 A    7/2012
(Continued)

*Primary Examiner* — Douglas W Owens
*Assistant Examiner* — Amy X Yang
(74) *Attorney, Agent, or Firm* — Akarsh P. Belagodu

(57) ABSTRACT

The present invention relates to a LED tube (1) for retrofitting in a fluorescent tube lighting fixture having a preheat phase during which the fluorescent tube lighting fixture is arranged to preheat filaments of a fluorescent tube, the LED tube (1) comprising: an array of LEDs (2), a LED driver (4) for driving the array of LEDs (2), a first pair of contact pins (8, 0) at a first end (12) of the LED tube (1) and a second pair of contact pins (14, 16) at a second end (18) of the LED tube (1) for connecting the LED tube (1) electronically and mechanically to the fluorescent tube lighting fixture, the first pair of contact pins (8, 10) being connected forming a first circuitry, the second pair of contact pins (14, 16) being connected forming a second circuitry, the LED driver (4) being connected between the first circuitry and the second circuitry, and a temperature controlled switch (20) having an open state and a closed state, and being arranged to adapt the closed state when heated, such that a current path between the first circuitry and the second circuitry is obtained, wherein a preheat current passing between the first pair of
(Continued)

contact pins (8, 10) during the preheat phase of the fluorescent tube lighting fixture is arranged to heat the temperature controlled switch.

15 Claims, 12 Drawing Sheets

(51) Int. Cl.
*F21V 25/04* (2006.01)
*F21K 9/27* (2016.01)
*F21K 9/272* (2016.01)
*F21V 15/015* (2006.01)
*F21V 23/00* (2015.01)
*F21V 23/04* (2006.01)
*F21Y 103/10* (2016.01)
*F21Y 115/10* (2016.01)

(52) U.S. Cl.
CPC ........ *F21V 23/003* (2013.01); *F21V 23/0457* (2013.01); *F21V 25/04* (2013.01); *F21Y 2103/10* (2016.08); *F21Y 2115/10* (2016.08); *H05B 41/2981* (2013.01); *Y02B 20/386* (2013.01)

(58) Field of Classification Search
CPC ... F21K 9/17; F21K 9/20; F21K 9/232; F21K 9/278; F21V 23/06; F21V 23/003; F21V 15/015; F21V 23/045; F21V 23/0464; H05B 33/0884; H05B 37/02; H05B 41/2981

USPC ...... 315/294, 74, 85, 291, 312, 51, 112–128
See application file for complete search history.

(56) References Cited

U.S. PATENT DOCUMENTS

| | | | |
|---|---|---|---|
| 4,211,958 A * | 7/1980 | Bickford | H05B 41/46 307/326 |
| 4,306,966 A | 12/1981 | Lucia | |
| 5,021,932 A | 6/1991 | Ivey | |
| 5,821,490 A * | 10/1998 | Blossfeld | H01H 1/58 200/523 |
| 5,836,066 A * | 11/1998 | Ingram | C22F 1/006 148/563 |
| 6,236,300 B1 * | 5/2001 | Minners | H01H 61/0107 148/402 |
| 8,894,430 B2 * | 11/2014 | Simon | F21V 25/04 439/226 |
| 2004/0104580 A1 * | 6/2004 | Spiessl | D06F 37/42 292/84 |
| 2010/0181178 A1 * | 7/2010 | Chang | F21V 19/008 200/341 |
| 2011/0260614 A1 | 10/2011 | Hartikka et al. | |
| 2013/0170180 A1 | 7/2013 | Lee | |

FOREIGN PATENT DOCUMENTS

| | | |
|---|---|---|
| JP | 2012195222 A | 10/2012 |
| JP | 2012212649 A | 11/2012 |
| JP | 2015525944 A | 9/2015 |
| WO | WO2013150417 A1 | 10/2013 |

* cited by examiner

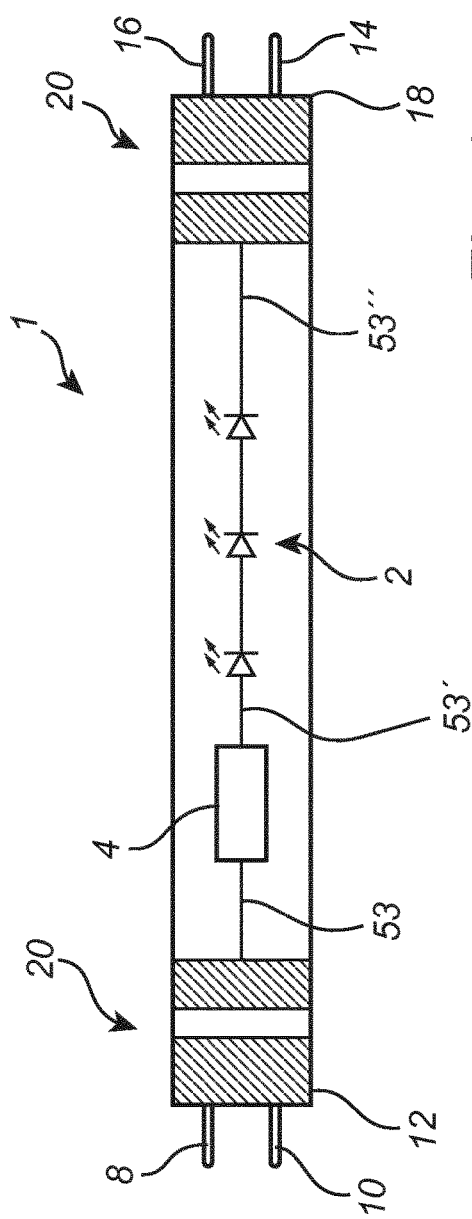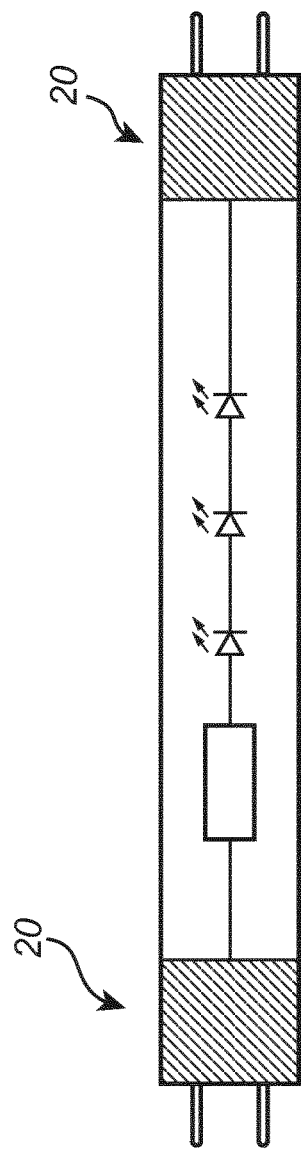

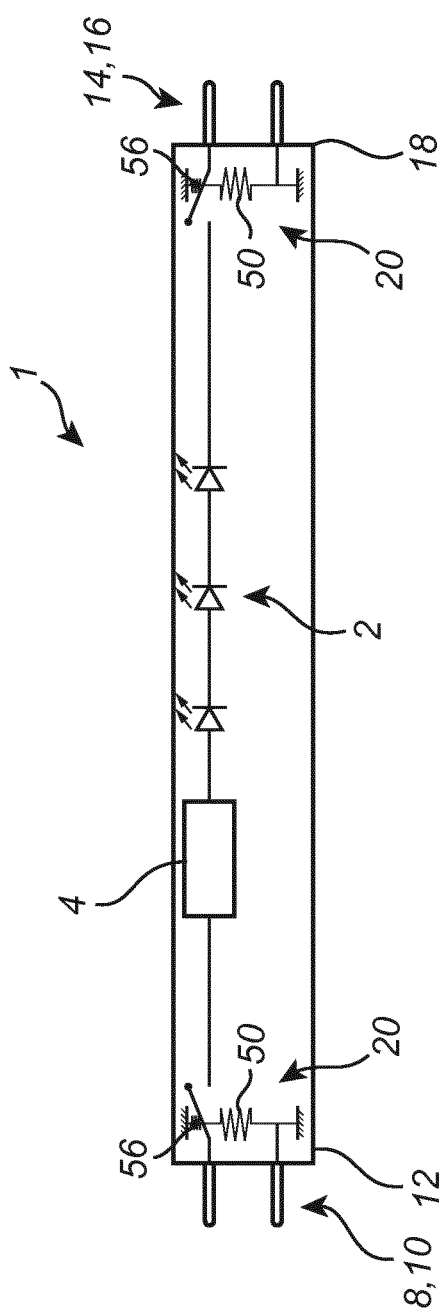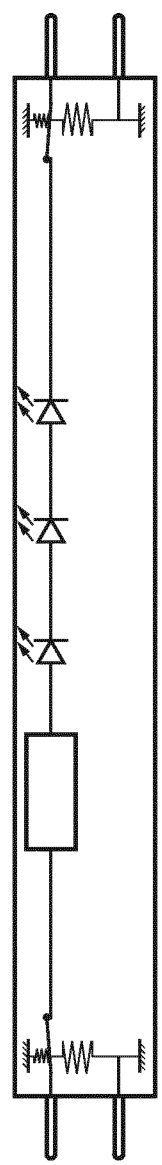
Fig. 2a
Fig. 2b

LED TUBE FOR RETROFITTING IN A FLUORESCENT TUBE LIGHTING FIXTURE

CROSS-REFERENCE TO PRIOR APPLICATIONS

This application is the U.S. National Phase application under 35 U.S.C. § 371 of International Application No. PCT/EP2015/050072, filed on Jan. 5, 2015, which claims the benefit of European Patent Application No. 14150893.7, filed on Jan. 13, 2014. These applications are hereby incorporated by reference herein.

FIELD OF THE INVENTION

The present invention is related to a LED tube for retrofitting in a fluorescent tube lighting fixture.

BACKGROUND OF THE INVENTION

In a traditional fluorescent tube lamp, the body of the lamp is a straight tube with a length of 15 to 60 times the diameter of the tube. Fluorescent tubes are low-pressure mercury discharge lamps in which the inner surface of the tube is coated with fluorescent material. The fluorescent tube lamp consists of an air-tight glass tube containing a small amount of mercury, an inert gas, a fluorescent coating, such as phosphor, and electrodes. At each end of the fluorescent tube, there is a lid with two symmetrically positioned contact pins, to which the electrodes are connected. Power supply to the fluorescent tube is provided via these contact pins. When the lamp is in operation, the temperature of the electrodes must be sufficiently high, so that electrons release from them. A fluorescent lamp does not ignite at a normal operation voltage without preheating. It is typical of fluorescent tubes that their cathodes are heated with separate preheat circuits or arrangements.

Retrofitting a fluorescent tube with a LED tube is nowadays becoming common. Retrofitting means replacing a fluorescent tube by a LED tube without altering the fluorescent tube lighting fixture except for removing or replacing the starter (if a passive-magnetic ballast is used) by a similar shaped device with a different function (this is optional).

When retrofitting a fluorescent tube with a LED tube a problem related to the risk of an electric shock during the mounting step of the LED tube occurs. According to the safety regulations in the field of electricity, fluorescent tube lighting fixtures are to be constructed in such a way that, when a fluorescent tube is replaced, it is not possible for a user to touch any parts at the mains voltage even if the fluorescent tube lighting fixture were carrying voltage. This requirement is met even if the fluorescent tube were replaced in such a way that only one end of the tube were in contact with the contacts of a tube holder of the fluorescent tube lighting fixture and the person replacing the tube can touch the other end of the tube. This requirement is met because no current goes through the gas-filled fluorescent tube before the gas in the tube is ionized with a starting pulse. In other words, the gas in the fluorescent tube serves as an insulator in itself. The electric structure of the lighting fixture, in turn, is such that generation of a starting pulse requires that both ends of the tube be connected to the contacts of the tube holders. This way the fluorescent tube prevents the risk of an electric shock during replacement.

With LED tubes, this electric safety requirement is not necessarily met. Inside LED tubes, there is a printed circuit or a corresponding structure, on which LEDs and electronic current supply components that they require are mounted. The purpose of these components is to convert the alternating voltage of the mains into direct voltage and to regulate the direct current required by the LEDs. In practice, current flows through these components once voltage is applied to them, in other words, the LED tube is in a conductive state without a separate starting pulse. Therefore, in a practical situation, when the LED tube is being mounted on a fluorescent tube lighting fixture, the contact pins at one end of the LED tube may hit the contacts of the tube holder of the fluorescent tube lighting fixture, and the other end of the tube may remain outside the fluorescent tube lighting fixture, so that the person mounting or replacing the tube may touch it, whereby he is prone to the risk of an electric shock.

US2011/0260614 discloses a LED tube for retrofitting in a fluorescent tube lighting fixture. The LED tube comprises a safety unit arranged to prevent a voltage from transferring through the tube lamp from its one end to the other until a voltage supplied from a corresponding tube holder of the fluorescent tube lighting fixture to the pair of contact pins has been separately detected at each end of the LED tube. Inside the LED tube, there is at least one optical line that is arranged to transfer a control or measurement signal associated with the safety unit from one end of the LED tube to the other without capacitive leakage currents. Although US2011/0260614 presents a solution to the above mentioned problem of the risk of an electric shook when retrofitting an LED tube in a fluorescent tube lighting fixture, the solution according to US2011/0260614 is complex and expensive due to the use of the optical line arranged to transfer a control or measurement signal associated with the safety unit from one end of the LED tube to the other.

SUMMARY OF THE INVENTION

It is an object of the present invention to overcome this problem, and to provide a simple and inexpensive solution to the risk of an electric shock when retrofitting an LED tube in a fluorescent tube lighting fixture.

According to a first aspect of the invention, this and other objects are achieved by a LED tube for retrofitting in a fluorescent tube lighting fixture having a preheat phase during which the fluorescent tube lighting fixture is arranged to preheat filaments of a fluorescent tube, the LED tube comprising an array of LEDs, a LED driver for driving the array of LEDs, a first pair of contact pins at a first end of the LED tube and a second pair of contact pins at a second end of the LED tube for connecting the LED tube electronically and mechanically to the fluorescent tube lighting fixture, the first pair of contact pins being connected forming a first circuitry, the second pair of contact pins being connected forming a second circuitry, the LED driver being connected between the first circuitry and the second circuitry; and a temperature controlled switch having an open state and a closed state, and being arranged to adopt the closed state when heated, such that a current path between the first circuitry and the second circuitry is obtained, wherein a preheat current passing between the first pair of contact pins during the preheat phase of the fluorescent tube lighting fixture is arranged to heat the temperature controlled switch.

The above LED tube is suitable for retrofitting in a fluorescent tube lighting fixture without the need to modify the fixture. The first temperature controlled switch having an open state and a closed state prevents a shock hazard from occurring during retrofitting of the LED tube in the fluorescent tube lighting fixture. The shock hazard is prevented since the temperature controlled switch will be open as long as the LED tube is not properly mounted into the fluorescent tube lighting fixture. It is only after proper mounting in the fixture the preheat phase starts.

The temperature controlled switch may comprise a thermo-mechanical actuator arranged to allow the temperature controlled switch to adopt the closed state when the thermo-mechanical actuator is heated. Thus, the temperature controlled switch may efficiently adopt the closed state when the thermo-mechanical actuator is heated. This is a cheap and simple way of implementing a switch safeguarding that the current path through the retrofit LED tube is only closed when properly mounted in the fluorescent tube lighting fixture.

The LED tube may further be provided with a second temperature controlled switch having an open state and a closed state, and being arranged to adopt the closed state when heated, such that a current path between the first circuitry and the second circuitry is obtained, wherein a preheat current passing between the second pair of contact pins during the preheat phase of the fluorescent tube lighting fixture is arranged to heat the second temperature controlled switch. Such a LED tube may prevent a shock hazard from occurring during retrofitting of the LED tube in the fluorescent tube lighting fixture also with drivers that deliver a preheat current even if only one pair of contact pins is installed.

The thermo-mechanical actuator may comprise a shape memory alloy member. Thus, the temperature controlled switch may efficiently adopt the closed state when the thermo-mechanical actuator is heated.

The thermo-mechanical actuator may be resilient. By making the thermo-mechanical actuator resilient it will more easily adapt between the open and closed state and between the closed and opened state.

The temperature controlled switch may further comprise a biased resilient member. The biased resilient member may help the temperature controlled switch to adopt the open state when the temperature controlled switch is cooled down. This is particularly suitable when the temperature controlled switch comprises a one-way shape memory alloy member.

According to one embodiment the temperature controlled switch comprises a resilient plunger, a latch, and a shape memory alloy member, wherein in the open state of the temperature controlled switch the resilient plunger is biased by means of the latch, and wherein the temperature controlled switch is arranged such that the shape memory alloy member is arranged to release the latch during the preheat phase such that the resilient plunger changes position and thereby converts the temperature controlled switch from the open state to the closed state. This embodiment benefits from avoiding or minimizing risk of arcing between charged conductive surfaces. Moreover, the shape memory alloy member (capable of over a million cycles) is only powered shortly and only once after tube installation. Furthermore, the energy used in ballasts to heat the filaments in fluorescent tube lighting fixtures can be utilized to power the shape memory alloy member. The shape memory alloy member have the right temperature range, force capability, resistance and actuation speed to be used in the pin safety solution according to the present invention. According to this embodiment the LED tube is activated by closing of the LED circuit once after mounting of the LED tube in a fluorescent tube lighting fixture. Hence, it is safeguarded that when the LED tube is properly mounted in the fluorescent tube lighting fixture the driver will always be connected between the first and second circuitry (the switch will remain in its closed state) as long as the LED tube remains mounted in the fluorescent tube lighting fixture.

Each contact pin of the first pair of contact pins may be individually movable in directions being perpendicular to a centerline of the LED tube, such that when the first end of the LED tube is removed from the fluorescent tube lighting fixture the current path between the first circuitry and the second circuitry is opened. The directions being perpendicular to the centerline of the LED tube may be opposite directions. By such an arrangement of the first pair of contact pins shock hazard could be prevented not only during mounting of the LED tube in the fluorescent tube lighting fixture, but also during removal of the LED tube. When the first end of the LED tube is removed from the fluorescent tube lighting fixture the resilient plunger may be arranged to apply a force on the first pair of contact pins such that they are moved in the directions being perpendicular to the centerline of the LED tube. Moreover, each contact pin of the first pair of contact pins may be resiliently movable in the directions being perpendicular to a centerline of the LED tube, and arranged such that when the first end of the LED tube is removed from the fluorescent tube lighting fixture the current path between the first circuitry and the second circuitry is opened, and the first circuitry is opened. The first pair of contact pins may further be arranged such that when the first circuit is open, and the resilient plunger is forced against it resilience and re-biased by means of latch the first circuit is closed. This will facilitate reuse of the LED tube after removal from a fluorescent tube lighting fixture.

According to a further embodiment the temperature controlled switch may comprise a shape memory alloy member, a pivotable member, and an elongate contact member having two contact portions and being electrically connected to the LED driver, wherein the contact member is connected to the pivotable member, and wherein the shape memory alloy member is arranged to pivot the pivotable member when heated by the preheat current such that the two contact portions of the contact member make contact with a respective contact pin of the first pair of contact pins such that the current path between the first circuitry and the second circuitry is obtained.

The temperature controlled switch may further comprise at least one biasing member arranged to pivot the pivotable member such that the contact member is released from contact with the first pair of contact pins thereby converting the first temperature controlled switch to its open state, when the preheat current is switched off. According to this embodiment the LED tube will be activated by closing the current path between the first and second circuitry once every time the LED tube is switched on. This requires no manual activation, but instead the shape memory alloy member activates the switch that closes the circuit through the LED tube every time the LED tube is switched on. Such a temperature controlled switch may be compact and silent and may be manufactured without any visible features on the outside of the end cap.

According to a further embodiment, the temperature controlled switch may comprise a slider, a resilient element, a shape memory alloy member, and a slider locking member, wherein the resilient element in one end is attached to the slider and in another end is attached fixed in relation to the LED tube, and the temperature controlled switch is arranged such that the shape memory alloy member exerts a force on the slider during the preheat phase such that the slider changes position and thereby converts the temperature controlled switch from the open state to the closed state and such that the slider is locked in its position in the closed state by the slider locking member and biased by the resilient element. The resilient element may be embodied in many different ways for example as an elastic band or as a spring.

Each contact pin of the first pair of contact pins may be resiliently and individually movable in directions being perpendicular to a centerline of the LED tube, and the slider may have at least one biasing portion for biasing of the first pair of contact pins in the open state, and at least one resilient portion for biasing of the first pair of contact pins in the closed state, wherein each contact pin is arranged such that when the first end of the LED tube is removed from the fluorescent tube lighting fixture the contact pins move the resilient portion of the slider thereby unlocking the slider from its position and from the slider locking member, such that the current path between the first circuitry and the second circuitry is opened.

According to a second aspect of the invention a temperature controlled switch having an open state and a closed state for opening and closing a current path between a first circuitry and a second circuitry of a LED tube (1) for retrofitting in a fluorescent tube lighting fixture having a preheat phase during which the fluorescent tube lighting fixture is arranged to preheat filaments of a fluorescent tube is provided. The first circuitry is formed between a first pair of contact pins at a first end of the LED tube. The second circuitry is formed between a second pair of contact pins at a second end of the LED tube. The temperature controlled switch is arranged to adopt the closed state when heated by a preheat current passing between the first pair of contact pins during the preheat phase of the fluorescent tube lighting fixture, such that a current path between the first circuitry and the second circuitry is obtained.

It is noted that the invention relates to all possible combinations of features recited in the claims.

BRIEF DESCRIPTION OF THE DRAWINGS

This and other aspects of the present invention will now be described in more detail, with reference to the appended drawings showing embodiments of the invention.

FIGS. 1a and 1b are schematic illustrations of a LED tube according to an embodiment of the present invention for retrofitting in a fluorescent tube lighting fixture.

FIGS. 2a and 2b are schematic illustrations of an alternative embodiment of the LED tube.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

Figure 3A:
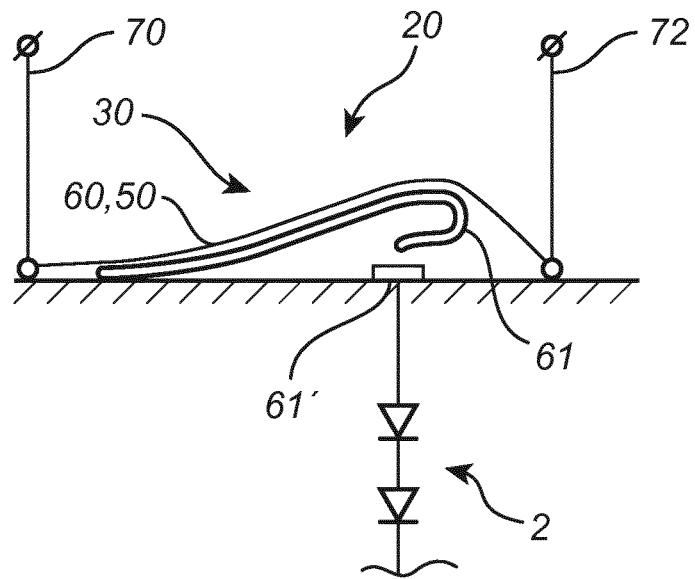
FIGS. 3a and 3b are schematic illustrations of an alternative embodiment of the present invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

This invention is compatible with all fluorescent tube lighting fixture having a preheat phase. During the preheat phase the fluorescent tube lighting fixture is arranged to apply a current between a first pair of contact pins at a first end of the fluorescent tube and between a second pair of contact pins at a second end of the fluorescent tube. The current is applied in order to heat a corresponding filament connected between said first and second pair of contact pins, respectively.

In FIGS. 1a and 1b, an example of a schematic LED tube according to an embodiment of the invention is illustrated. The LED tube 1 comprises an array of LEDs 2, a LED driver 4 for driving the array of LEDs 2, a first pair of contact pins 8, 10 at a first end 12 of the LED tube 1 and a second pair of contact pins 14, 16 at a second end 18 of the LED tube 1. The contact pins 8, 10, 14, 16 are arranged for connecting the LED tube 1 electronically and mechanically to the fluorescent tube lighting fixture (not shown). The first pair of contact pins 8, 10 being connected forming a first circuitry. The second pair of contact pins 14, 16 being connected forming a second circuitry. The LED driver 4 is connected between the first circuitry and the second circuitry. With the exception of wires 53, 53', 53" connecting the LED driver 4 and the array of LEDs 2, wires are not illustrated. It is understood that voltage may be applied over the two pairs of contact pins, and that a preheat current may be passed between contact pins of a pair of contact pins. A temperature controlled switch 20 is schematically illustrated in the figures at both the first end 12 and at the second end 18 of the LED tube 1. The temperature controlled switches 20 of FIG. 1a are illustrated in an open state, indicated by the white fields, illustrating that current cannot pass between contact pins 8, 10 and the array of LEDs 2 or between contact pins 14, 16 and the array of LEDs 2, and the temperature controlled switches 20 of FIG. 1b are illustrated in a closed state illustrated by the temperature controlled switches 20 being filled. In this open state, current cannot pass between the first circuitry and the second circuitry, i.e. current cannot pass through the LED tube. Thus the risk of electric shock to any person mounting the LED tube is minimized. The temperature controlled switches 20 are arranged to adopt the closed state illustrated in FIG. 1b when heated, such that a current path between the first pair of contact pins 8, 10 and the second pair of contact pins 14, 16 may be obtained. The preheat current passing between the pairs of contact pins 8, 10 and 14, 16 during the preheat phase of the fluorescent tube lighting fixture is arranged to heat the temperature controlled switch.

Although the embodiment of the LED tube in FIGS. 1a and 1b is illustrated with two temperature controlled switches 20 it is realized that LED tube according to the present invention alternatively may comprise only one or more than two temperature controlled switches.

According to one embodiment the LED tube 1 comprises both a first and a second temperature controlled switch arranged at a first and a second end of the LED tube, respectively. Both the first and a second temperature controlled switch are having an open state and a closed state. The first temperature controlled switch is arranged to adopt the closed state when heated. The second temperature controlled switch is arranged to adopt the closed state when heated. When the first temperature controlled switch is in the closed state a current path between the first circuitry and the second circuitry is obtained. Moreover, when the second temperature controlled switch is in the closed state a current path between the second circuitry and the first circuitry is obtained. This may prevent a shock hazard from occurring during retrofitting of the LED tube in the fluorescent tube lighting fixture also with drivers that deliver a preheat current even if only one pair of contact pins is installed.

Moreover, although the temperature controlled switches 20 are illustrated at both ends of the LED tube 1, it is understood that the temperature controlled switch of embodiments may be mounted, for example, at one or both end caps of the LED tube, in the LED tube, or on the driver board.

According to one embodiment, the temperature controlled switch may comprise a thermo-mechanical actuator arranged to allow the temperature controlled switch to adopt the closed state when the thermo-mechanical actuator is heated.

According to one embodiment, the thermo-mechanical actuator may comprise a shape memory alloy member. The shape memory alloy member may comprise one or more alloys selected from the group comprising copper-aluminum-nickel alloys; nickel-titanium alloys; and alloys of zinc, copper, gold and iron. Shape memory alloys and shape memory alloys members may change shape when heated or cooled.

According to one embodiment, the shape memory alloy, SMA, may have a two-way shape memory effect. Thus, the temperature controlled switch may efficiently and repeatedly adopt the closed state when the thermo-mechanical actuator is heated and the open state when the thermo-mechanical actuator is cooled. A two-way shape memory effect of a SMA refers to the effect that the shape memory alloy member remembers two different shapes: one at low temperatures, and one at high-temperature. Thus, for example, when heated the shape memory alloy member obtains its high temperature shape, and when later cooled the shape memory alloy member obtains its low temperature shape, and if heated again obtains its high temperature shape. A material that shows a shape-memory effect during both heating and cooling may be referred to as a two-way SMA.

According to one embodiment, the SMA may have a one-way shape memory effect. When a one-way shape memory effect shape memory alloy is in a cold state, the shape memory alloy member with an original shape can be deformed, such as for example bent or stretched, and will hold the deformed shape until heated above a transition temperature. Upon heating, the deformed shape changes to the original shape. When the metal cools again it will remain in the original, until deformed again. The SMA having a one-way shape memory effect may be biased, such as by means of one or more springs, such that it returns to the deformed shape when cooled.

When the LED tube is taken out of the fluorescent tube lighting fixture or when the power to the fluorescent tube lighting fixture is switched off, the SMA cools down and may either (i) in the case of a one-way shape memory effect be forced to its original shape, such as for example by means of a biasing spring, or (ii) in the case of a two-way shape memory effect the SMA spontaneously returning to its original shape.

In FIGS. 2a and 2b, an embodiment for LED tube 1 for retrofitting in a fluorescent tube lighting fixture (not illustrated) having a preheat phase is illustrated. Although the temperature controlled switch in this example of an embodiment is illustrated comprising a shape memory alloy member, it is understood that other suitable temperature controlled switches may be used. For example, according to an alternative embodiment, a temperature controlled switch using a bi-metal may be used.

It may be preferred to use shape memory alloys over bi-metals, as the temperature controlled switch using a shape memory alloy may be faster and producing higher force, and the shape memory alloy may be more efficiently heated than the bi-metal. The LED tube 1 comprises an array of LEDs 2, and a LED driver 4 for driving the array of LEDs 2. A first pair of contact pins 8, 10 is arranged at a first end 12 of the LED tube 1. A second pair of contact pins 14, 16 is arranged at a second end 18 of the LED tube 1. The first and second pairs of contact pins 8, 10, 14, 16 are arranged to connect the LED tube 1 electronically and mechanically to the fluorescent tube lighting fixture. The first pair of contact pins 8, 10 being connected forming a first circuitry. The second pair of contact pins 14, 16 being connected forming a second circuitry. The LED driver 4 is connected between the first circuitry and the second circuitry. A temperature controlled switch 20 is positioned at a first end 12 of the LED tube 1, and a temperature controlled switch 20 is positioned at a second end 12 of the LED tube 1. The temperature controlled switches 20 are illustrated in an open state in FIG. 2a. In this open state, current cannot pass between the first circuitry and the second circuitry, i.e. current cannot pass through the LED tube. Thus the risk of electric shock to any person mounting the LED tube is minimized. A preheat current may be passed from one of the first pair of contact pins 8, 10 to the other and from one of the first pair of contact pins 14, 16 to the other once the LED tube is mounted in the fluorescent tube lighting fixture. That is, a preheat current may be passed via temperature controlled switch 20 once the LED tube is mounted in the fluorescent tube lighting fixture. When the preheat current start passing through the temperature controlled switch 20 the temperature controlled switch 20 will start to get heated. This will result in that the temperature controlled switch 20 will adopt its closed state (closed state illustrated FIG. 2b). When the temperature controlled switch 20 is in its closed state current is allowed to pass through the LED tube 1 to illuminate it. According to this embodiment, the temperature controlled switch 20 comprises an electro-mechanical actuator in form of a shape memory alloy member 50 and a biasing member 56, wherein the shape memory alloy member 50 contracts when heated thus resulting in biasing member 56 expanding. Biasing member 56 may act in returning shape memory alloy member 50 into its original shape, which may be particularly beneficial if shape memory alloy member 50 has one way memory effect. If shape memory alloy member 50 has a two way memory effect biasing member 56 may be omitted.

By arranging a first and a second temperature controlled switch within the LED tube the risks of shock hazard during mounting of the LED tube 1 in a fixture may be minimized even further. For example in such a case that the preheat current is delivered even if only one pair of contact pins is installed in the fluorescent tube lighting fixture.

Figure 3B:
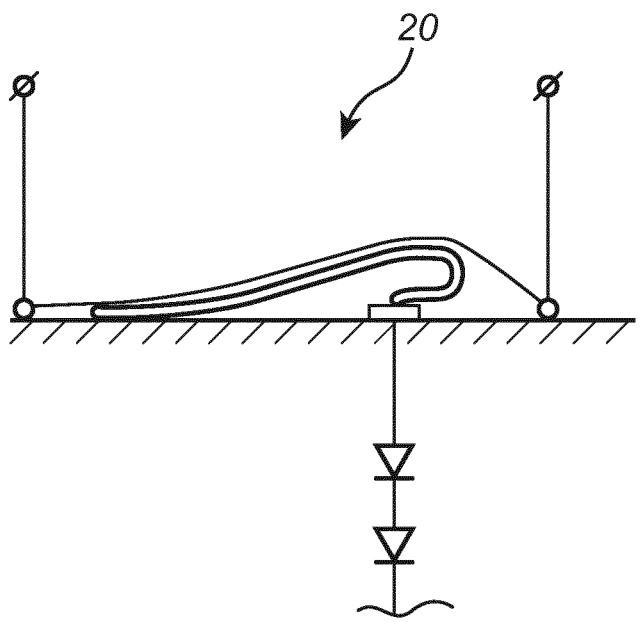

FIGS. 3a and 3b schematically illustrate an embodiment of a temperature controlled switch 20 as a part of a LED tube 1 according to the present invention. FIG. 3a illustrates a part of a LED tube with the temperature controlled switch 20 in the open state. FIG. 3b illustrates the LED tube with temperature controlled switch 20 in the closed state. Only a part of the LED tube 1 is being illustrated including contacts 70, 72, corresponding to, or in electrical contact with, a pair of contact pins (not illustrated), and an array of LEDs 2. The temperature controlled switch 20 comprises a thermo-mechanical actuator 30 comprising a shape memory alloy member 50, and contact members 61 and 61'. Contact member 61 is resilient. In the embodiment illustrated in FIGS. 3a and 3b, a shape memory alloy member 30 in the form of a wire 60 is illustrated. When a preheat current passes through the wire 60 the wire 60 will contract such that the temperature controlled switch 20 will be converted to a closed state. If the shape memory alloy has a two way memory, a continuous preheat current may be particularly suitable. The wire 60 is positioned over the contact member 61, and when the wire 60 is fed with the preheat current the temperature of the wire 60 will increase such that the wire 60 will contract and subject a force on the contact member 61 such that it will convert the temperature controlled switch to the closed state. It is realized that instead of the shape memory alloy member being in the shape of a wire, suitable elongated shapes may be used, such as, for example, elongated plates, springs, or threads.

Figure 4A:
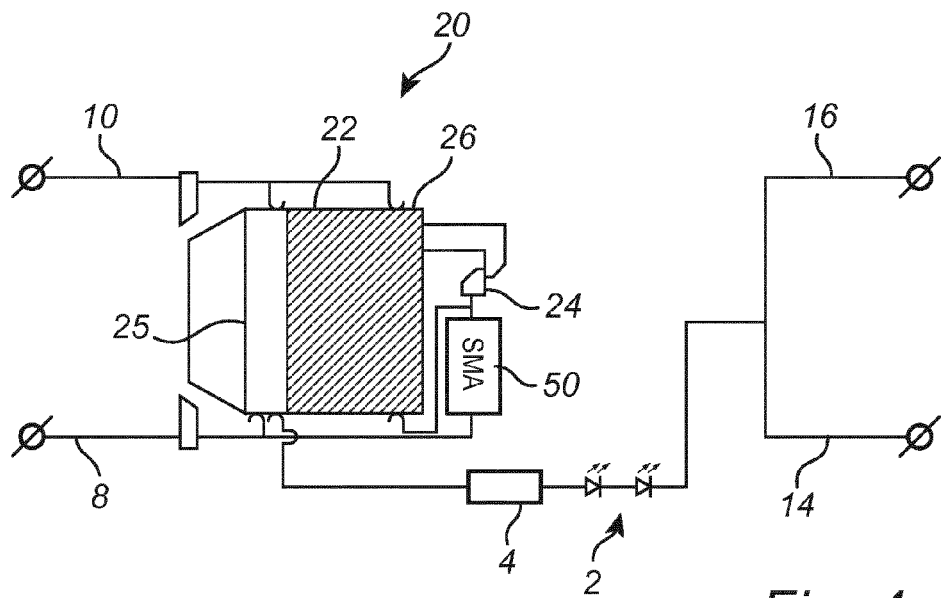
FIGS. 4a to 4d are schematic illustrations of an alternative embodiment of the LED tube.

A further embodiment of the present invention will now be discussed with reference to FIGS. 4a to 4d. FIG. 4a schematically illustrates a LED tube 1 having an array of LEDs 2, a LED driver 4, a first pair of contact pins 8, 10, and a second pair of contact pins 14, 16. The contact pins 8, 10, 14, 16 are arranged for connecting the LED tube 1 electronically and mechanically to the fluorescent tube lighting fixture (not shown). The first pair of contact pins 8, 10 being connected forming a first circuitry. The second pair of contact pins 14, 16 being connected forming a second circuitry. The LED driver 4 is connected between the first circuitry and the second circuitry. Electrically conductive wires are illustrated by black lines. At one end of the LED tube 1, the temperature controlled switch 20 is positioned.

FIG. 4a illustrates the temperature controlled switch 20 in an open state. The temperature controlled switch 20 comprises a plunger 22 biased by means of a latch 24 of a thermo-mechanical actuator in the form of a shape memory alloy member 50. The plunger 22 has an electrically non-conductive part 25 and an electrically conductive part 26. The electrically conductive part 26 is illustrated by diagonally oriented lines. In the configuration illustrated in FIG. 4a, current can pass from one to the other of the first pair of contact pins 8, 10 via the electrically conductive part 26 of the plunger 22 and via a shape memory alloy member 50 circuit. However, in the configuration illustrated in FIG. 4a current cannot pass from the first circuitry to the second circuitry as a result of the non-conductive part 25 of the plunger 22. Hence, current cannot pass through the LED tube 1 as a result of the non-conductive part 25 of the plunger 22. That is, the temperature controlled switch 20 is in an open state. In this open state, current cannot pass between the first circuitry and the second circuitry, i.e. current cannot pass through the LED tube. Thus the risk of electric shock to any person mounting the LED tube is minimized. Thus, safe installation of the LED tube 1 is provided. When the LED tube is mounted in the fluorescent tube lighting fixture (not illustrated) and switched on, preheat current would pass through the shape memory alloy member 50.

Figure 4B:
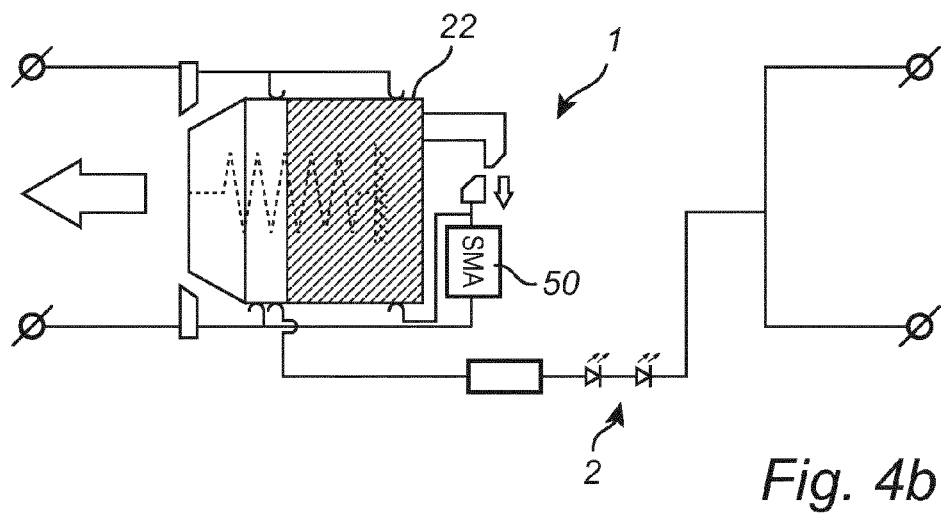

FIG. 4b illustrates the LED tube 1 when mounted in a fluorescent tube lighting fixture (not illustrated) and during the preheat phase when current has passed through and thus heated the shape memory alloy member 50, resulting in the shape memory alloy 50 contracting and releasing the latch from plunger 22. In this state, the temperature controlled switch is still in an open state and current cannot pass through the LED tube 1. However, as a result of the plunger 22 being biased and the latch having been released, the plunger is forced in the direction of the arrow, i.e. in a direction towards the end of the LED tube.

Figure 4C:
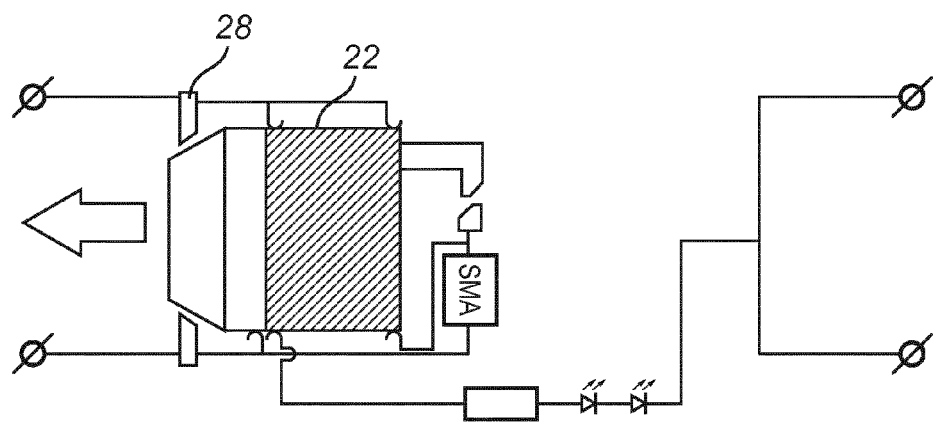

In FIG. 4c, the plunger 22 is illustrated as it moves in the direction of the arrow, in this position both the shape memory alloy member 50 circuit and the circuit through the LED tube 1 are closed. This is made so that current interruption is prevented. The conductive surfaces make sliding contacts to prevent arcing as a result of shock motions between the charged, conductive surfaces.

Figure 4D:
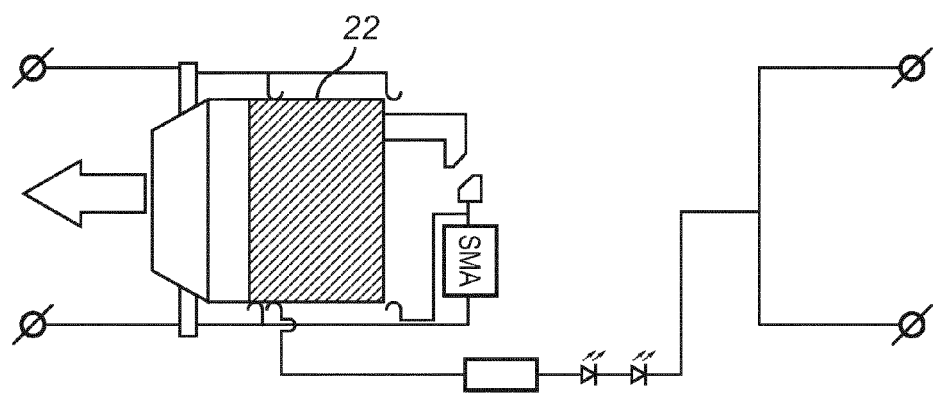

In FIG. 4d, the plunger 22 has stopped its motion as a result of stoppers 28. In this position the shape memory alloy member 50 circuit is open and the circuit through the LED tube is closed. Hence the LED driver 4 will be subjected to a current for driving the array of LEDs 2. In this configuration, the LED tube would remain while mounted in fluorescent tube lightning fixture (not illustrated).

The embodiment illustrated in FIGS. 4a to 4d benefits from avoiding or minimizing risk of arcing between charged conductive surfaces. Moreover, according to the embodiment illustrated in FIGS. 4a to 4d the SMA (capable of over a million cycles) is only powered shortly and only once after tube installation. Furthermore, the energy used in ballasts to heat the filaments in fluorescent tube lighting fixtures can be utilized to power the thermo-mechanical actuator in the form of the SMA member 50. The SMA member 50 have the right temperature range, force capability, resistance and actuation speed to be used in the pin safety solution according to the present invention.

According to an additional embodiment, the LED tube may be described by the LED tube disclosed and discussed with reference to FIGS. 4a to 4d, and further wherein the latch may be mechanically released from the plunger by means of contacting it with a latch release member, such as for example a pin, a rod or a nail, or any other suitable object, contacted with the latch. The temperature controlled switch 20 of the LED tube 1 may further comprise an access hole giving access to the latch by said latch release member. Such a LED tube 1 may thus function independent of the preheat current and makes the LED tube and temperature controlled switch 20 suitable for all ballasts.

Figure 5:
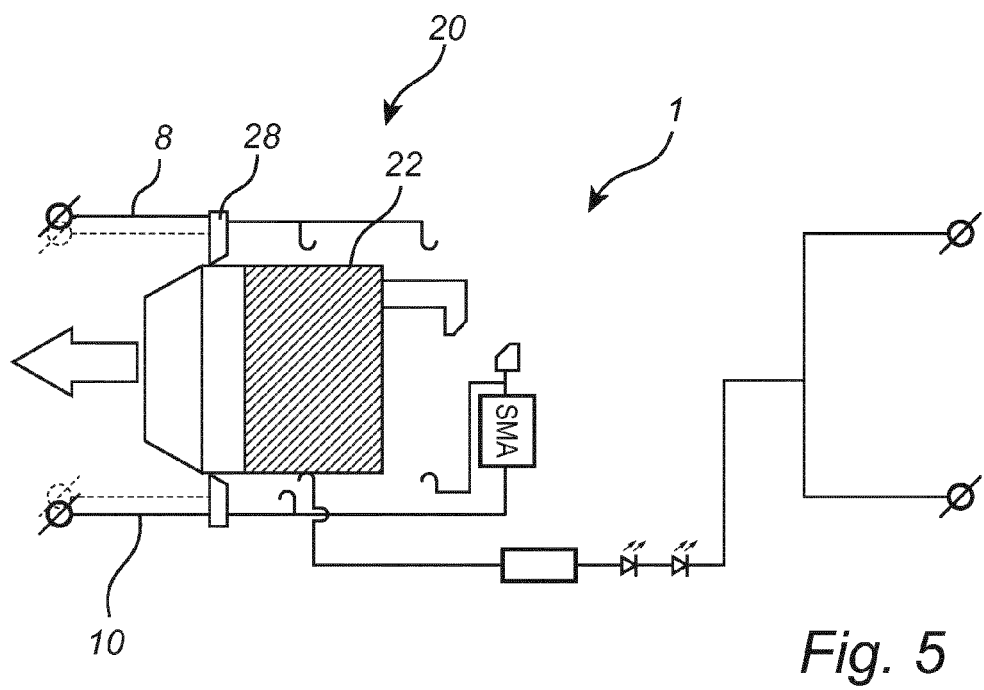
FIG. 5 is a schematic illustration of an alternative embodiment of the LED tube.
Figure 6:
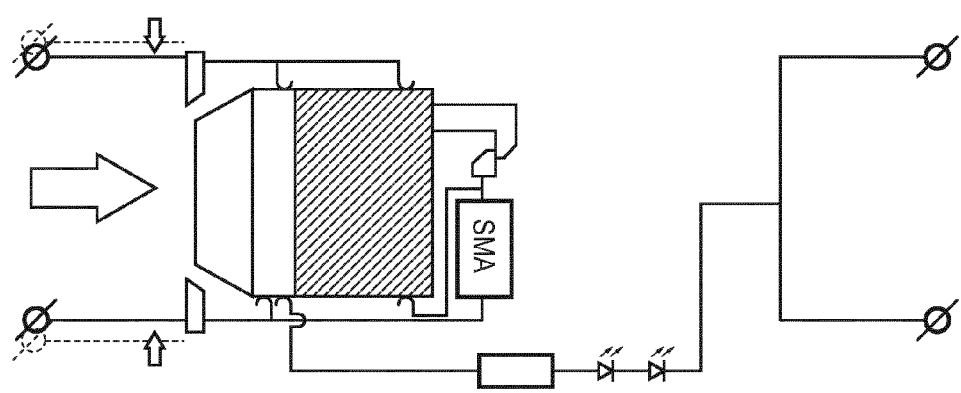
FIG. 6 is a schematic illustration of an embodiment of the LED tube.

Desirably, shock hazard should be prevented not only during mounting of the LED tube in the fluorescent tube lighting fixture, but also during removal of the LED tube, as during such removal one pair of the contact pins could be removed from the fluorescent tube lighting fixture while the other pair of the contact pins still remaining in the fluorescent tube lighting fixture. According to one embodiment, and with reference to FIG. 5, deactivation of the LED tube 1 is illustrated. One purpose with this embodiment is to prevent shock hazard during removal of the LED tube 1 from the fluorescent tube lighting fixture (not illustrated). According to this embodiment, which suitably may be combined with for example the embodiment discussed with reference to FIGS. 4a to 4d, the contact pins 8, 10 of the first pair of contact pins are resiliently arranged, such that when in the fluorescent tube lighting fixture the contact pins are biased by the fluorescent tube lighting fixture with a force by the pins directed outwards from a centerline of the LED tube 1. During removal of one end of the LED tube 1 from its the fluorescent tube lighting fixture, the plunger 22 will, due to its resilience, proceed in the direction of the arrow (towards the end of the LED tube). As a combined result of the stoppers 28 being tapered, the resilience of the contact pins, and the tapered shape of the front end of the plunger, the contact pins will be forced outwards in a direction from the centerline of the LED tube 1, thus losing electrical contact with the plunger 22 and as a result the circuit through the LED tube 1 will be opened and shock hazard prevented. This state may be the state in which the LED tube 1 is provided to a customer or user of the LED tube 1. Further, in this state, as illustrated in FIG. 5, the distance between the contact pins (8, 10) may be selected such that the LED tube 1 could not be remounted in a fluorescent tube lighting fixture. If the LED tube 1 should be re-mounted in a fluorescent tube lightning fixture, the plunger 22 could be pushed, for example by a finger of a user or during production or packaging of the LED tube, inwards in a direction towards the center of the LED tube 1 during which process the contact pins 8, 10 due to their resilience would reclaim its original position, and again be in electrical contact with the plunger 22, as illustrated in FIG. 6. The temperature controlled switch 20 may also be arranged such that the shape memory alloy member 50 and the latch 24 would convert the temperature controlled switch 20 into its open state during such a process. This may be an alternative state of the LED tube 1 when delivered, for example, to a customer or user. It is realized that instead of the user using a finger for pushing the plunger 22, any suitable object may be used, such as the tip of a pen or a ballpoint pen, and the plunger 22 may for such a purpose be provided with, for example, a conical recess for receiving, for example, the tip of the pen.

Embodiments have now been described, and further embodiments will be discussed with references to FIGS. 10 and 11, which embodiments discloses a LED tube which is activated by closing of the LED circuit once after mounting of the LED tube 1 in a fluorescent tube lighting fixture. Attention will now be turned to embodiments concerning a type of LED tube 1 which will be activated by closing the LED circuit once every time the LED tube is switched on, which embodiments will be discussed with reference to FIGS. 7 to 9.

Figure 7:
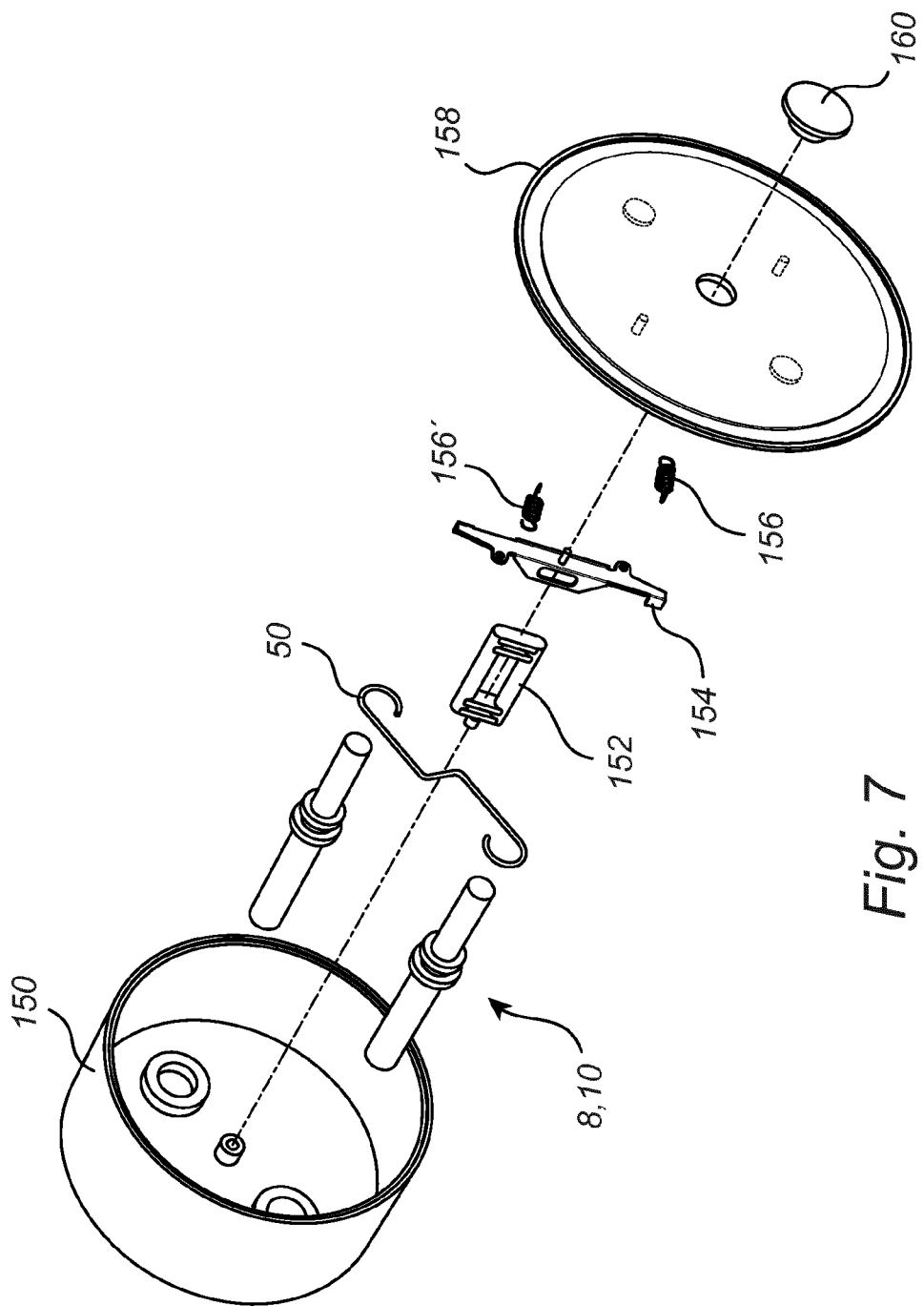
FIGS. 7-9 are a schematic illustrations of a temperature controlled switch according to an embodiment of the present invention.
Figure 8:
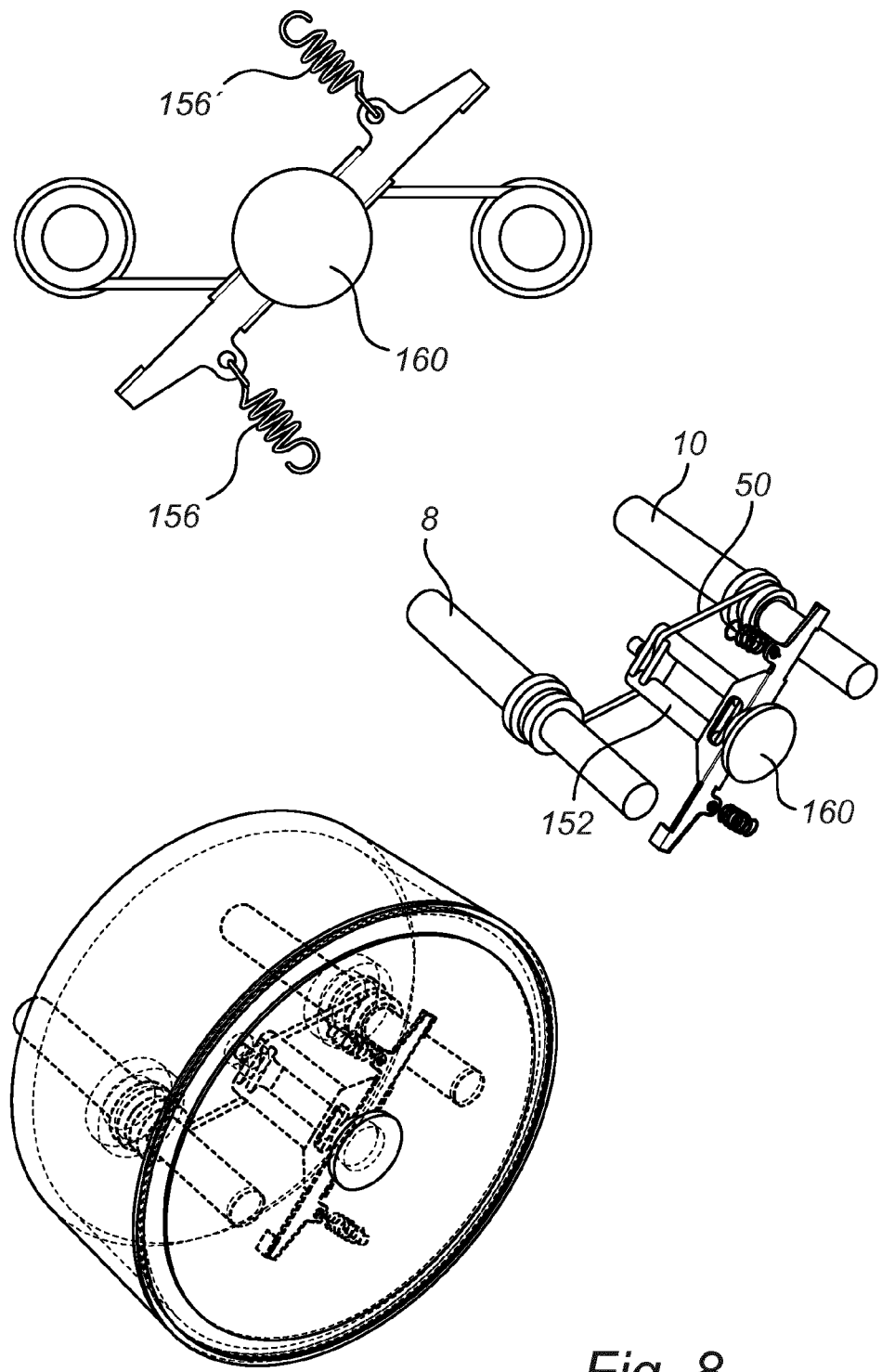
Figure 9:
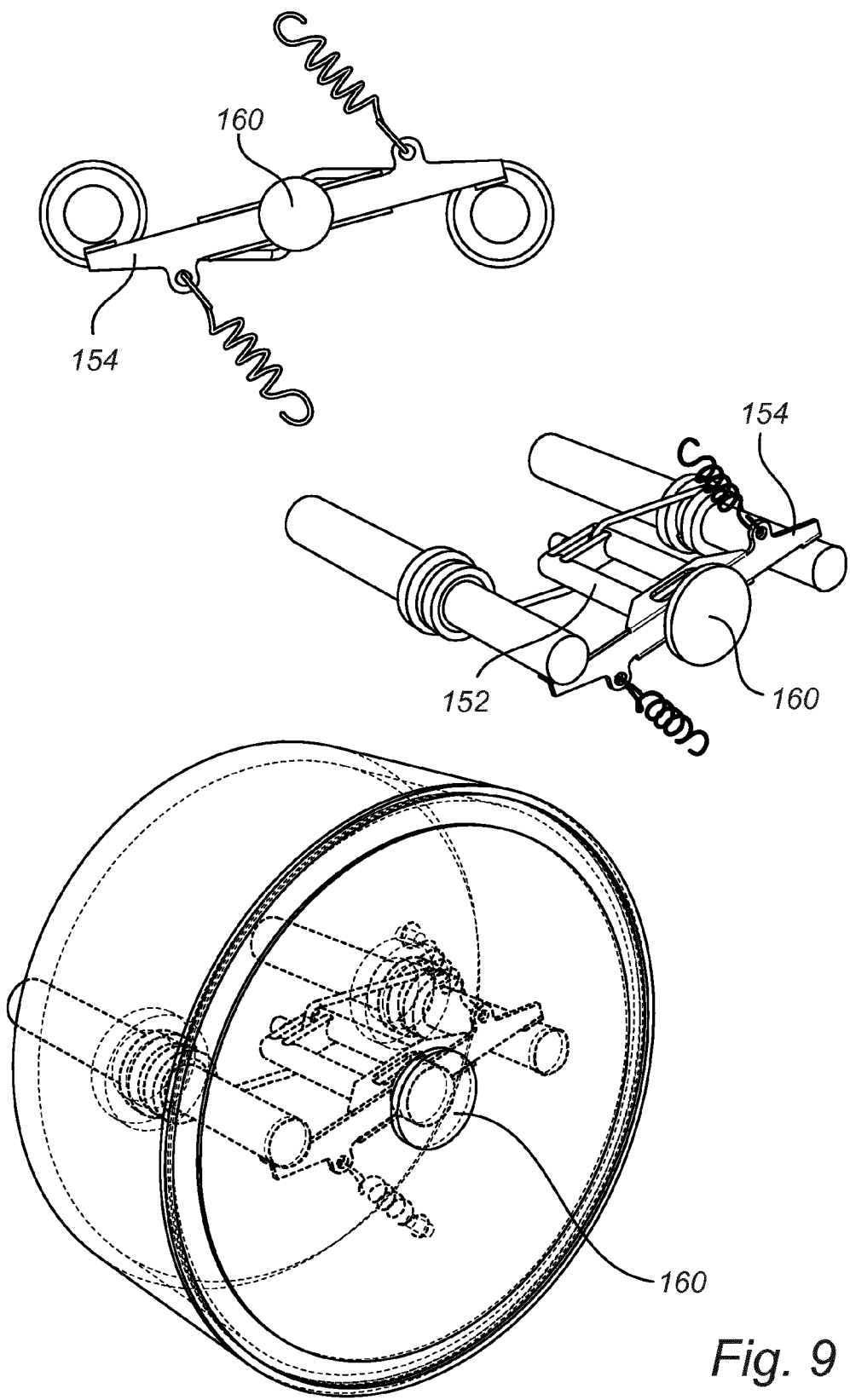

With reference to FIGS. 7 to 9 an embodiment of a temperature controlled switch to be used in a LED tube according to the present invention is illustrated. In FIG. 7 parts of a temperature controlled switch 20 are illustrated. The illustrated type of temperature controlled switch 20 is of a type which will be activated once every time the LED tube is switched on. In FIG. 7 are illustrated an end cap shell 150 to be connected to a first end 12 of a LED tube 1, a pair of contact pins 8, 10, a shape memory alloy member 50, a pivotable member 152, an elongate contact member 154 having two contact portions and being electrically connected to the LED driver (not shown) via a contact plate 160, biasing springs 156, 156', and an end cap 158. FIG. 8 illustrates the parts of a temperature controlled switch 20 of FIG. 7 mounted as they may appear in a LED tube 1. The pivotable member 152 is electrically insulated. It will be understood from viewing FIG. 8 that the temperature controlled switch in this configuration is in an open state; current cannot pass from the contact pins to the contact plate. It will further be understood that the preheat current can pass between the contact pins 8, 10 via the shape memory alloy member 50. When the preheat current passes through the shape memory alloy member 50 it will be heated such that it contracts and thus acts on the pivotable member 152 such that the pivotable member 152 pivots resulting in the temperature controlled switch adopting its closed state, as illustrated in FIG. 9. As illustrated in FIG. 9, heating of the shape memory alloy member 50 results in that it contracts resulting in pivoting of the pivotable member 152. As a result the elongate contact member 154, connected to the pivotable member 152, also pivots. When the elongate contact member 154 pivots contact is made between each of the contact portions of the elongate contact member 154 and a respective contact pin (8, 10) of the first pair of contact pins (8, 10). As a result the contact plate 160 will be in contact with the contact pins 8, 10 and thus closing the circuit through the LED tube. Hence, a current path between the first circuitry and the second circuitry may be obtained. The embodiment illustrated in FIGS. 8-9 are suitable with continuous preheat currents and with shape memory alloys having a two-way memory effect, such that when the LED tube power is switched off, the shape memory alloy will cool and, assisted by the biasing springs, return to the state illustrated in FIG. 7.

Figure 10B:
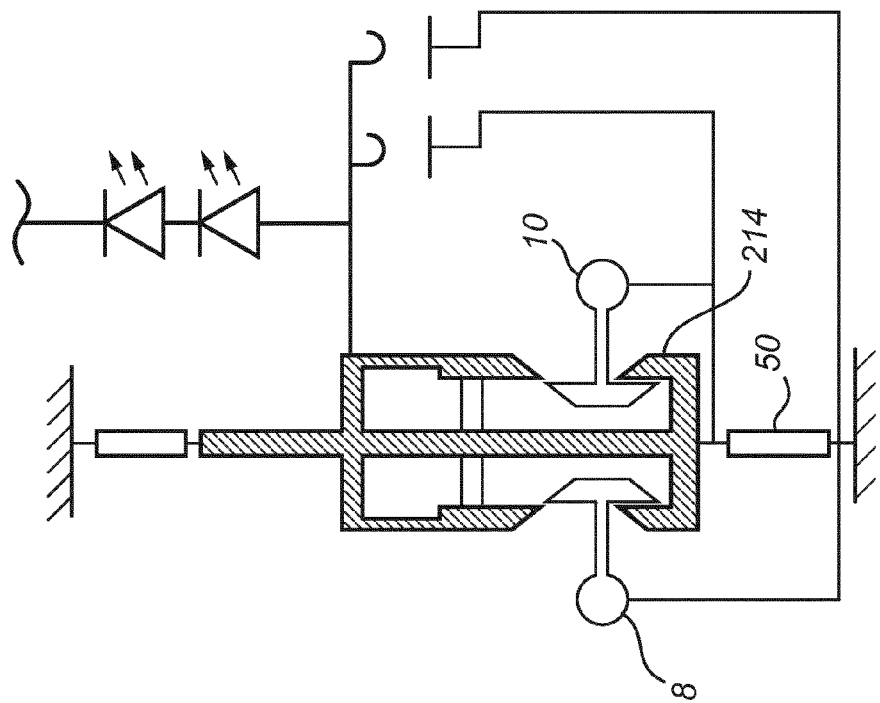
FIGS. 10a to 10d are schematic illustrations of an alternative embodiment of the invention.
Figure 10A:
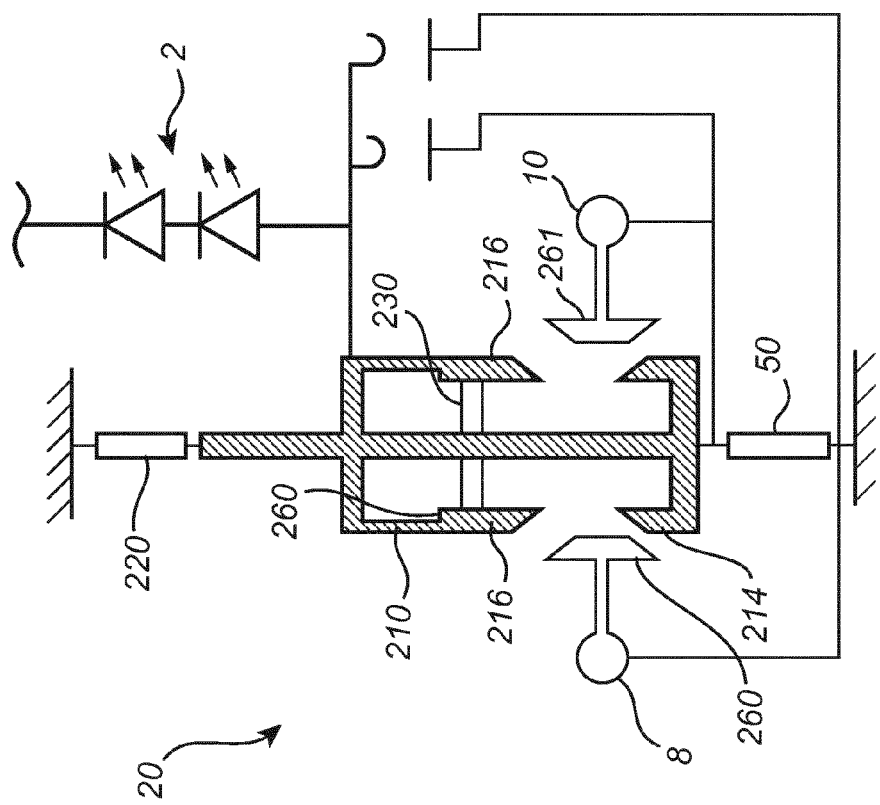
Figure 10C:
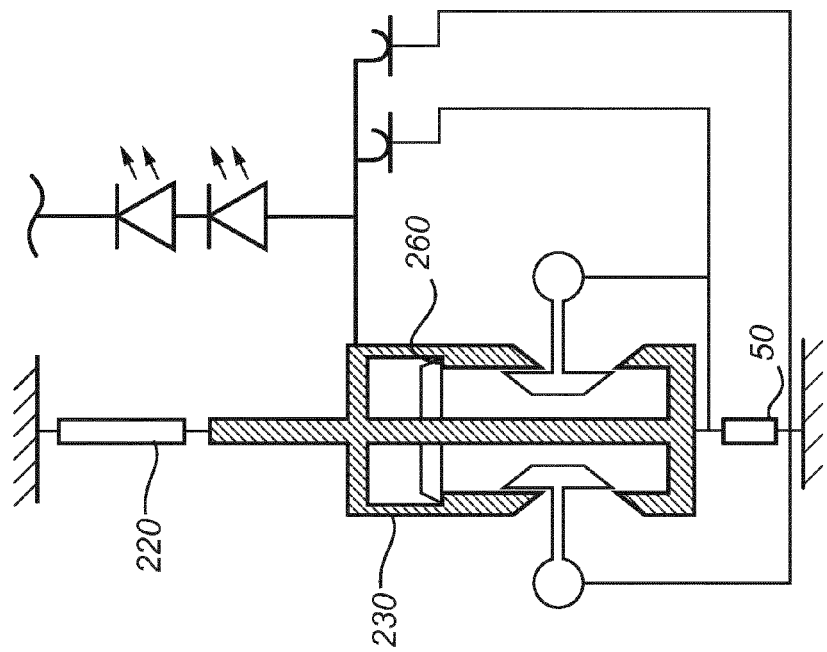
Figure 10D:
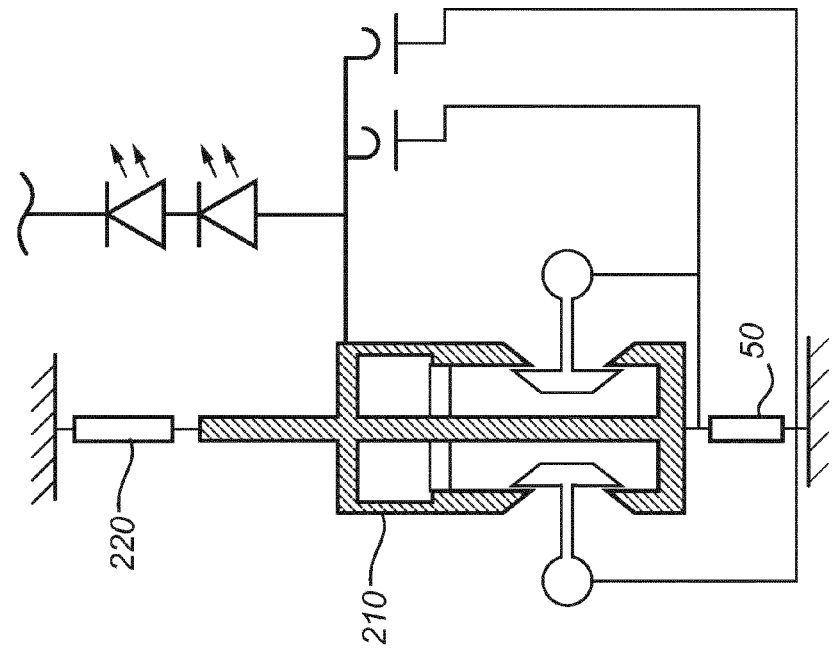
Figure 11B:
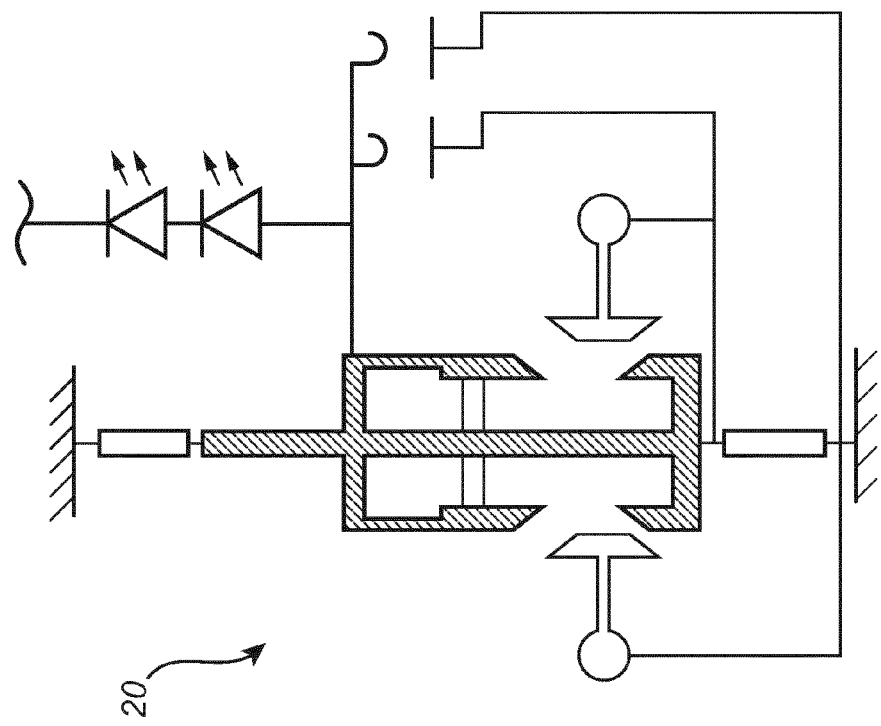
FIGS. 11a to 11b are schematic illustrations of an alternative embodiment of the invention.
Figure 11A:
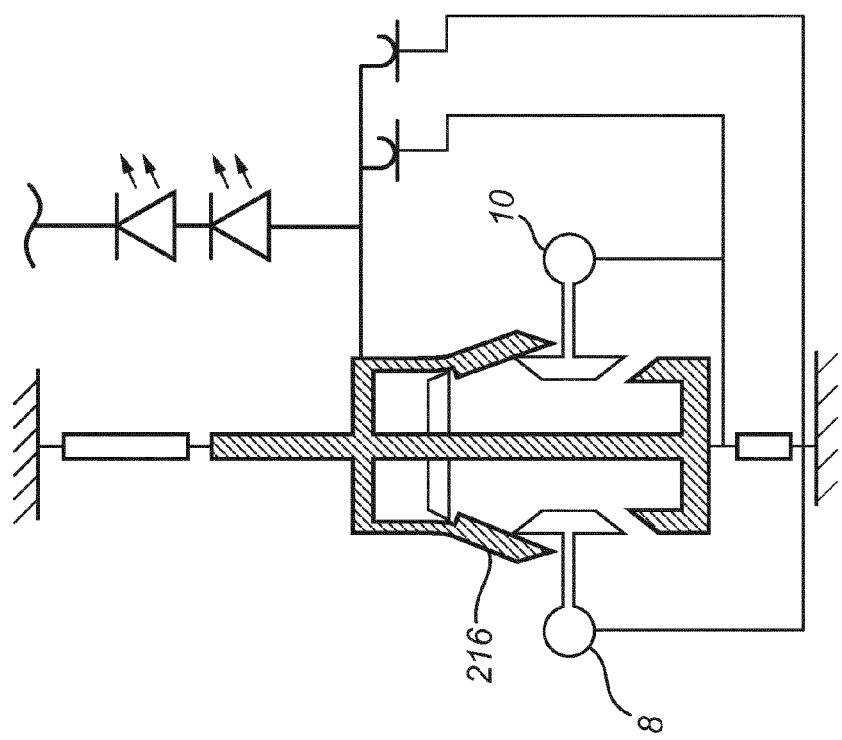

Referring to FIGS. 10*a* to 10*d*, a further embodiment of the present invention will now be discussed. FIG. 10*a* schematically illustrates the temperature controlled switch 20 in its open state and as a part of a LED tube 1 having an array of LEDs 2, and first pair of contact pins 8, 10. The contact pins 8, 10 are arranged for connecting the LED tube 1 electronically and mechanically to the fluorescent tube lighting fixture (not shown). In FIGS. 4*a* to 4*d*, the contact pins 8, 10 are illustrated as seen along the length of the contact pins, thus the exemplary circular shapes of the contact pins 8, 10 correspond to the cross sections of the contact pins 8, 10. The contact pins 8, 10 are according to this embodiment each provided with a releasable locking member 260, 261. Although not illustrated in the FIGS. 4*a* to 4*d*, the contact pins 8, 10 are resilient, such as, for example, by means of springs, such that they may resiliently flex orthogonal to the length axis of the contact pins 8, 10 and, thus, the LED tube 1. Further, there is provided a slider 210, which can slide along an elongated axis of the slider. A resilient element 220 is attached to the slider 210 at one end and fixed in relation to the LED tube 1 at the other end. In the state illustrated in FIG. 4*a*, the resilient element 220 is compressed, and in the state illustrated in FIG. 4*d* elongated with a force to compress but biased by the contracted shape memory alloy member 50. The slider 210 has a biasing portion 214 and a resilient portion 216, each for holding the contact pins 8, 10 in bias when the temperature controlled switch 20 is in its open state and its closed state respectively. The shape memory alloy member 50 in FIGS. 4*a* and 4*b* are elongated corresponding to a cold shape, in FIG. 4*d* shortened corresponding to a hot shape, and in FIG. 4*c* of intermediate length corresponding to a shape during heating. The contact pins 8, 10 are illustrated with a larger distance between each other in which configuration they cannot be fitted in tube lighting fixture. FIG. 10*b* illustrates the LED tube 1 prepared to be fitted in the tube lighting fixture, wherein the contact pins 8, 10 have been pushed in against their resilience, whereby the contact pins 8, 10 are held biased by biasing portion 214 of the slider 210 with a shorter distance between each other. Note that in this configuration, as illustrated in FIG. 4*b*, the temperature controlled switch is in its open state, and thus the risk of electric shock during installation is minimized. During the preheat phase, the shape memory alloy member 50 will according to this embodiment contract, as illustrated in FIG. 10*c*, thus pulling the slider towards the shape memory alloy 50 and against the bias of resilient element 220. Note that, as illustrated in FIG. 10*c*, the circuit is still open. In FIG. 10*d*, the shape memory alloy 50 has contracted further to its hot shape, and slider locking member 230 have locked the slider against the lip 260, thus preventing the slider 210 from retracting and preventing converting the temperature controlled switch 20 from its closed to its open state the independent of any force from the resilient element 220. In this configuration the lamp circuit is closed. If the LED tube according to the embodiment discussed with reference to FIGS. 10*a* to 10*d* is removed from the tube lighting fixture, the bias of the contact pins 8, 10 resulting from contact with the resilient portion 216 of the slider 210 and the tube lighting fixture would be released and the contact pins 8, 10 would push the resilient portion 216 of the slider outwards as illustrated in FIG. 11*a*, thus converting the pins their configuration with a wider distance between each other and releasing the locking actions on the slider, which due to the resilient element 220 would be moved and thus opening the circuit and thus avoiding any risks of shock hazard, as illustrated in FIG. 11*b*.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A LED tube for retrofitting in a fluorescent tube lighting fixture having a preheat phase, the LED tube comprising:
   an array of LEDs;
   a LED driver for driving the array of LEDs;
   a first pair of contact pins at a first end of the LED tube and a second pair of contact pins at a second end of the LED tube for connecting the LED tube electronically and mechanically to the fluorescent tube lighting fixture, the first pair of contact pins being connected forming a first circuitry, the second pair of contact pins being connected forming a second circuitry, the LED driver being connected between the first circuitry and the second circuitry; and
   a temperature controlled switch comprising a resilient plunger with an electrically conductive portion and an electrically non-conductive portion, the temperature controlled switch having an open state and a closed state, and being arranged to adopt the closed state when heated, such that a current path between the first circuitry and the second circuitry is obtained, wherein a preheat current passing between the first pair of contact pins during the preheat phase of the fluorescent tube lighting fixture is arranged to heat the temperature controlled switch and a portion of the temperature controlled switch extending between the first pair of contact pins contracts when heated to adopt the closed state,
   wherein the preheat current path passes between the first pair of contact pins via the electrically conductive part of the plunger in the open state.

2. The LED tube according to claim 1, wherein the temperature controlled switch comprises a thermo-mechanical actuator arranged to allow the temperature controlled switch to adopt the closed state when the thermo-mechanical actuator is heated.

3. The LED tube according to claim 2, wherein the thermo-mechanical actuator comprises a shape memory alloy member.

4. The LED tube according to claim 3, wherein the shape memory alloy member has a two-way memory effect.

5. The LED tube according to claim 2, wherein the thermo-mechanical actuator is resilient.

6. The LED tube according claim 1, wherein the temperature controlled switch further comprises a biased resilient member.

7. The LED tube according to claim 1, wherein the temperature controlled switch further comprises a latch and a shape memory alloy member, wherein in the open state of the temperature controlled switch the resilient plunger is biased by means of the latch, and wherein the temperature controlled switch is arranged such that the shape memory, alloy member is arranged to release the latch during the preheat phase such that the resilient plunger change position and thereby convert the temperature controlled switch from the open state to the closed state.

8. The LED tube according to claim 7, wherein each contact pin of the first pair of contact pins is individually movable in directions being perpendicular to a centerline of the LED tube, such that when the first end of the LED tube is removed from the fluorescent tube lighting fixture the current path between the first circuitry and the second circuitry is opened.

9. The LED tube according to claim 8, wherein when the first end of the LED tube is removed from the fluorescent tube lighting fixture the resilient plunger is arranged to apply a force on the first pair of contact pins such that they are moved in the directions being perpendicular to the centerline of the LED tube.

10. The LED tube according to claim 8, wherein each contact pin of the first pair of contact pins is resiliently movable in the directions being perpendicular to the centerline of the LED tube, such that when the first end of the LED tube is removed from the fluorescent tube lighting fixture the current path between the first circuitry and the second circuitry is opened, and the first circuitry is opened.

11. The LED tube according to claim 10, wherein the first pair of contact pins further is arranged such that when the first circuit is open, and the resilient plunger is forced against its resilience and re-biased by means of latch the first circuit is closed.

12. The LED tube according to claim 1, wherein the temperature controlled switch comprises a slider, a resilient element, a shape memory alloy member, and a slider locking member, wherein the resilient element in one end is attached to the slider and in another end is attached fixed in relation to the LED tube, and
   the temperature controlled switch is arranged such that the shape memory alloy member exerts a force on the slider during the preheat phase such that the slider change position and thereby convert the temperature controlled switch from the open state to the closed state and such that the slider is locked in its position in the closed state by the slider locking member and biased by the resilient element.

13. The LED tube according to claim 12, wherein each contact pin of the first pair of contact pins is resiliently and individually movable in directions being perpendicular to a centerline of the LED tube, and wherein the slider has at least one biasing portion for biasing of the first pair of contact pins in the open state, and at least one resilient portion for biasing of the first pair of contact pins in the closed state, wherein each contact pin of the first pair of contact pins is arranged such that when the first end of the LED tube is removed from the fluorescent tube lighting fixture the contact pins move the at least one resilient portion of the slider thereby unlocking the slider from its position and from the slider locking member, such that the current path between the first circuitry and the second circuitry is opened.

14. A LED tube for retrofitting in a fluorescent tube lighting fixture having a preheat phase, the LED tube comprising:

an array of LEDs;

a LED driver for driving the array of LEDs, a first pair of contact pins at a first end of the LED tube and a second pair of contact pins at a second end of the tube for connecting the tube electronically and mechanically to the fluorescent tube lighting fixture, the first pair of contact pins being connected forming a first circuitry, the second pair of contact pins being connected forming a second circuitry, the LED driver being connected between the first circuitry and the second circuitry; and a temperature controlled switch having an open state and a closed state, and being arranged to adopt the closed state when heated, such that a current path between the first circuitry and the second circuitry is obtained, wherein a preheat current passing between the first pair of contact pins during the preheat phase of the fluorescent tube lighting fixture is arranged to heat the temperature controlled switch and a portion of the temperature controlled switch extending between the first pair of contact pins contracts when heated to adopt the closed state, the temperature controlled switch comprising a shape memory alloy member having a two-way memory effect, a pivotable member, and an elongate contact member having two contact portions and being electrically connected to the LED driver via a contact plate, wherein the elongate contact member is connected to the pivotable member, and wherein the shape memory alloy member is arranged to pivot the pivotable member when heated by the preheat current such that the two contact portions of the elongate contact member make contact with a respective contact pin of the first pair of contact pins such that the current path between the first circuitry and the second circuitry is obtained via the contact plate.

15. The LED tube according to claim 14, wherein the temperature controlled switch further comprises at least one biasing member arranged to pivot the pivotable member such that the elongate contact member is released from contact with the first pair of contact pins thereby converting the temperature controlled switch to its open state, when the preheat current is switched off.

* * * * *